United States Patent

[11] 3,570,806

| [72] | Inventors | Oded E. Sturman<br>Arleta;<br>Salvatore A. Sciortino, North Hollywood;<br>Abdul R. Kassir, San Gabriel, Calif. |
|---|---|---|
| [21] | Appl. No. | 791,027 |
| [22] | Filed | Jan. 14, 1969 |
| [45] | Patented | Mar. 16, 1971 |
| [73] | Assignee | Bell Aerospace Corporation |

[54] BALANCED ELECTROMECHANICAL CONTROL VALVE
4 Claims, 3 Drawing Figs.

[52] U.S. Cl. .................................................... 251/65,
251/129, 251/282
[51] Int. Cl. ........................................................ F16k 31/08
[50] Field of Search ................................................. 251/65,
129, 75, 282, 335.1, 335, 61, 61.2

[56] References Cited
UNITED STATES PATENTS

| 420,155 | 1/1890 | Hageman | 251/50 |
| 1,237,981 | 8/1917 | Webster | 251/335.1X |
| 1,385,681 | 7/1921 | Hammond | 251/335.1 |
| 2,723,055 | 11/1955 | Beard, Jr. | 251/321X |
| 2,826,215 | 3/1958 | Wolfslau et al. | 251/282X |
| 3,414,231 | 12/1968 | Kreuter | 251/282X |

*Primary Examiner*—Arnold Rosenthal
*Attorney*—Nilsson, Robbins, Wills & Berliner ABSTRACT: An electromechanical control valve in which a poppet is biased against a seat therefor within an enclosing chamber having inlet and outlet ports and which is balanced against fluid pressure forces. Oppositely disposed walls of the chamber are deformable and a force-transmitting rod carries the poppet between such deformable walls whereby displacement of the poppet causes deformation of the walls to urge the poppet in the opposite direction. A system geometry is utilized which takes into account the effective surfaces of the poppet and the configurations of the walls when deformed. In particular embodiments, bias on the poppet is obtained by the application of the magnetic potential of a permanent magnet operatively associated with an armature extension of the poppet outside the chamber. The permanent magnet biases the poppet to its seat and a coil is disposed on the armature to oppose the permanent magnet potential whereby the deformed chamber walls, acting as springs, urge the poppet to an open position.

PATENTED MAR 16 1971 3,570,806

INVENTORS
ODED E. STURMAN
ABDUL R. KASSIR
SALVATORE A. SCIORTINO

BY Nilsson + Robbins
ATTORNEYS

BALANCED ELECTROMECHANICAL CONTROL VALVE

BACKGROUND OF THE INVENTION

1. Field of the Invention

The fields of art to which the invention pertains include the fields of fluid handling, valve and valve actuation.

2. Description of the Prior Art

There is a need for lightweight, reliable and responsive on-off valves, particularly for controlling fluid flow in the rocket propulsion industry where such characteristics are critical to the success of a launching. It is very desirable that such valves operate substantially independent of fluid pressures so that response times are predictable and reliable under a wide variety of conditions. Typically, in attempting the mitigate the effect of changes in fluid pressure, valves have been utilized with sliding fits of Neoprene O-rings. Such valves suffer from leakage under high pressure, generally short useful life, and material incompatibility.

There is also a need for an improved valve-actuating mechanism. Initially, solenoid valves provided a relatively inexpensive means for controlling fluid flow, but such valves require a relatively long time to build up sufficient magnetic field for actuation. Accordingly, as the demand for higher reliability and faster response increased, the solenoid valve proved to be too limited and torque-motor-operated valves came into use. However, the torque-motor valve contains features relating to symmetry and linearity of force output which are not necessary for on-off actuation and such features penalize other performance characteristics as well as substantially increase the cost of the device.

SUMMARY OF THE INVENTION

The present invention represents a new generation of on-off valves and is designed specifically for such operation. It utilizes a pressure-balanced mechanism, which substantially cancels all pressure forces. It contains only metal parts and no sliding fits. It is a one-stage valve, requiring no pilot fluid flows, and is sufficiently lightweight, reliable and responsive to be utilized as a high-performance electrohydraulic servovalve in aircraft or missile applications. Unlike the solenoid valve, the present invention utilizes a permanent magnet that has been optimized for on-off actuation and the magnetic circuit is completely isolated from the fluid flow chambers. Unlike the torque-motor valve which develops torque on signal, devices of the present invention lose torque on signal. The devices of this invention are faster acting, lighter and more compact than present electromechanical switching devices that are designed for the same application. They are of relatively simple design and are low in cost. The saving in work energy obtained by balancing the fluid pressure forces generated within the valve allows relatively large orifice diameters to be utilized to control relatively large flows at high pressures.

Specifically, a valve is provided, comprising a valve head, means defining a first chamber and a port therefor and means including a first wall that is mechanically connected to the valve head and having a portion that is resiliently deformed when the valve head is in a preselected position. A seat for the valve head is provided defining a second port for the chamber, and means are provided for controlling the position of the valve head. The deformed wall functions as cantilever plates and in accordance with this invention, the effective surface areas of the valve seat and deformed wall are sized to be substantially equivalent to thereby substantially balance the pressure forces of the fluid within the chamber. Means are provided for biasing the valve head to the preselected position and for decreasing the bias. The resiliently deformed wall has sufficient spring moment to move the valve head out of its preselected position upon decrease of the bias.

In particular embodiments, means are provided defining a second chamber and a port therefor, the second chamber means including a second resiliently deformable wall that is also mechanically connected to the valve head. The effective areas of this second wall and of the facing valve head surface are also sized to be substantially equivalent to substantially balance the pressure forces of the fluid within the second chamber. The result is a valve in which a housing defines an enclosure having two chambers with a port in each chamber and a pair of oppositely disposed resiliently deformable walls. A force-transmission rod connects the deformable walls and carries a poppet therebetween. The enclosure is divided into the two chambers by means that define a seat for the poppet to expose opposite poppet surfaces to the respective deformable walls when the poppet is seated.

Means are provided biasing the poppet to be preselected position with respect to the seat. In this respect, a magnetic potential is applied with predetermined force to bias the valve head to the preselected position. Means are also provided for decreasing such predetermined force whereby the spring moments of the deformed walls urge the valve head in an opposite direction. Specifically, a permanent magnet is utilized to generate a magnetic potential which acts on an armature mechanically connected to the valve head through the deformed walls to preload the valve head in its seat. A coil is disposed on the armature and is energizable to develop a magnetic potential in opposition to the permanent magnetic potential to thereby decrease the permanent magnet force on the armature and allow the springiness of the walls to move the valve head out of its seat.

DESCRIPTION OF THE PREFERRED EMBODIMENTS

Figure 1:
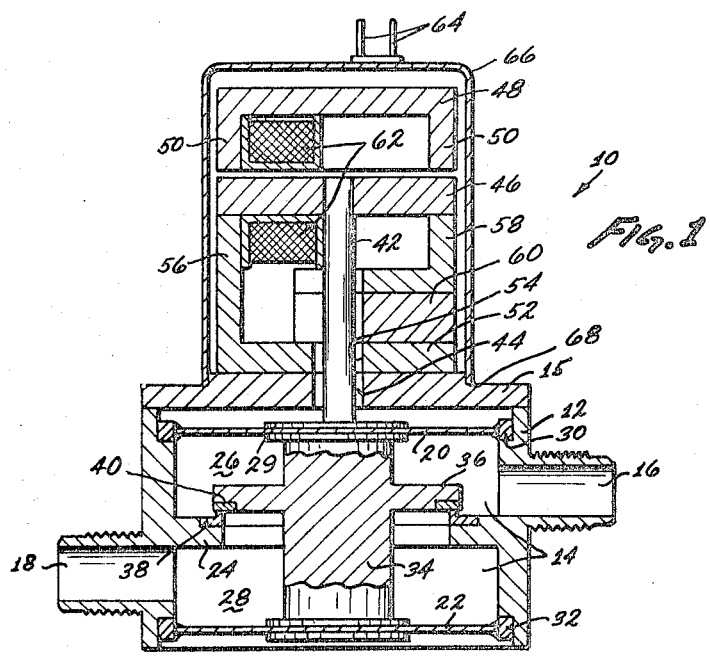
FIG. 1 is a schematic, cross-sectional representation of a valve constructed in accordance with the present invention.

Referring to FIG. 1, a valve 10 is shown having a housing 12 defining an enclosure 14 and inlet and outlet ports 16 and 18, respectively, and having a roof 15 thereon. A pair of oppositely disposed isolation walls 20 and 22 are provided on opposite sides of the enclosure 14. An annular flange 24 protrudes inwardly from the inner surface of the housing 12 between and planar with the isolation walls 20 and 22. The annular flange 24 defines, with the isolation walls 20 and 22, upper and lower chambers 26 and 28, respectively, within the enclosure 14. The upper isolation wall 20 is welded to an annular shoulder 30 formed on the top inner surface of the generally cylindrical housing 12. The lower isolation wall 22 is similarly welded to an annular shoulder 32 formed on the bottom inner surface of the housing 12.

A force transmission rod 34 is rigidly secured between the isolation walls 20 and 22 and has flange annularly disposed thereon defining a valve poppet 36. The inwardly disposed housing flange 24 is provided with an annular tungsten carbide washer top surface 38 which defines a seat for the poppet 36 and the poppet 36 is provided with a bottom surface 40 of tungsten carbide. The transmission rod 34 is connected at its opposite ends to the upper an lower isolation walls 20 and 22 so that displacement of the valve head 36 results in identical flexure of both walls 20 and 22.

The isolation walls 20 and 22, which may also be called isolation springs, are similar to flat flexure diaphragms only in that they physically isolate the enclosure 14 to separate it from the actuation areas of the valve and they flex in response to movement of the valve head, but they are much thicker and have spring moments of much greater magnitude than typical flexure diaphragms. The thickness and spring rate of the isolation walls 20 and 22 are very important to the operation of the valve. The isolation walls must be deformable but thick enough to withstand high fluid pressure and have sufficient mechanical strength to rapidly move the valve head. The isolation walls 20 and 22 can be constructed as shown, as separate members welded to the housing 12 or they can be part of the housing 12 itself, i.e., as integral walls thereof formed thin enough to be deformable.

The sizes of the walls 20 and 22, poppet 36 and valve seat 24 are chosen carefully to obtain a pressure-balanced system. A system geometry is utilized which takes into account the effective areas of the opposite poppet 36 surfaces and the configurations assumed by the isolation walls 20 and 22 when deformed. In this regard, the isolation walls 20 and 22 function as cantilever plates and appropriate seat 24, transmission rod 34 and wall 20, 22 sizes can be calculated utilizing well-known equations. (See for example, cases 19 and 20 on page 222 of "Formulas for Stress and Strain" by R.J. Roark, Mc-Craw, Hill Brook Co., New York (4th Edition, 1965). In this manner, the effect of the pressure load on the poppet is cancelled by the opposite forces applied over the surfaces of the isolation walls. The result is a pressure balance allowing the sliding of the poppet 36 into and out of the seat 24 with substantial independence of fluid pressure. In a particular case, pressure balance is obtained utilizing a transmission rod 34 diameter of 1.033 inches, a mean seat diameter of 2.010 inches, and equal isolation wall 20 and 22 diameters of 3.100 inches.

With regard to the actuation mechanism, a support shaft 42 extends as a continuation of the force transmission rod 34, through the thicker central portion 29 of the upper isolation wall 20, through an aperture 44 in the housing roof 15 and terminates in a perpendicularly set armature 46 of magnetically permeable material. A circular upper frame member 48 of magnetically permeable material is disposed atop the armature 46 and is spaced therefrom by means of flanges 50 extending downwardly from the upper frame member 48. A lower frame member 52 of magnetically permeable material is supported on the housing roof 15. The support shaft 42 extends through an aperture 54 in the lower frame member 52. The armature 46 is supported via the support shaft 42 by the upper isolation wall 20. For maximum transfer of sealing force, in the lowermost closed position, the armature 46 barely touches a flanged extension 56 of the lower frame member 52, on the left side (in the drawing) and a pole piece 58 on the right side, but the poppet is driven by the transmission rod 34 hard against its seat 24. The pole piece 58 and right side of the lower frame member 52 sandwich an Alnico permanent magnet 60. A coil 62 is disposed on the armature 46 on the left side thereof, between the upper frame member and the extension flange 56. Electrical leads 64 are provided to the coil 62 for applying current thereto. The pole piece 58, frame means 48 and 52 and permanent magnet 60 are secured to the housing roof 15 by means of screws (not shown). A cover plate 66 is provided overlying the magnetic circuit and is threadedly attached to the housing roof 15 at 68.

In operation, the valve 10 is normally closed by a preload force exerted on the poppet 36 that is equal to the moment generated by the permanent magnet 69 minus the moment required to bend the isolation walls 20 and 22, without regard to any pressure differential since the system is pressure balanced. In a closed position, without air gaps, the magnetic force is at its maximum. The magnetic attraction exerted by the permanent magnet 60 is exerted on the armature 46 so as to attract the armature 46 to the pole piece 58 and lower frame member flange 56.

When the coil 62 is energized, magnetic potential is developed across the armature 46 which opposes the permanent magnet 60 potential with a resultant decrease in permanent magnet force. The coil 62 potential also generates magnetic flux about the flanges 50 of the upper frame member 48 at all positions throughout the air gap thereat. When the net magnetic moment equals the spring-bending moments of the upper and lower isolation walls 20 and 22, the armature-poppet assembly 46-34-36 moves from the closed position to the open position.

Figure 2:
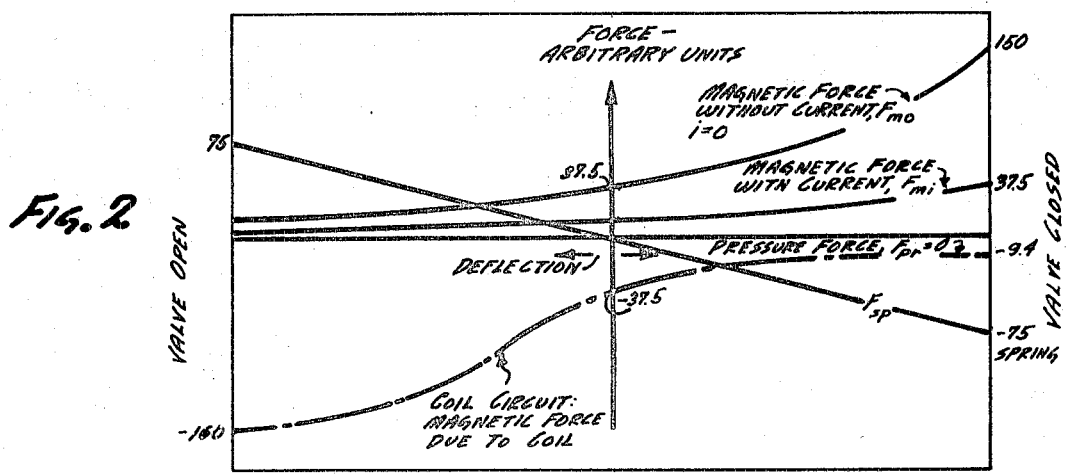
FIG. 2 depicts a moment deflection plot for a valve of this invention.

Referring to the operation of the valve 10 in more detail, FIG. 2 depicts changes in magnetic and spring moment with changes in deflection of the isolation walls 20 and 22. The valve 10 is normally closed by a preloading permanent magnet force exerted via the armature 46 and transmission rod 34 on the poppet 36. At the initial, closed position, the preloading magnetic force is at its maximum since, with no air gap, the reluctance of the magnetic circuit thereat is at its minimum. The isolation walls 20 and 22 acting as springs are unstressed when the poppet 36 is positioned midway between the open and closed position, but exert a force opposing the permanent magnet moment when the poppet 36 is seated. Accordingly, the preloading force is equal to the moment generated by the magnetic force of the permanent magnet 69 minus the total moments required to bend the isolation walls 20 and 22. With reference to FIG. 2, the preloading force is equal to $F_{mo}$ minus $F_{sp}$ (150−75) = 75 units of force.

Figure 3:
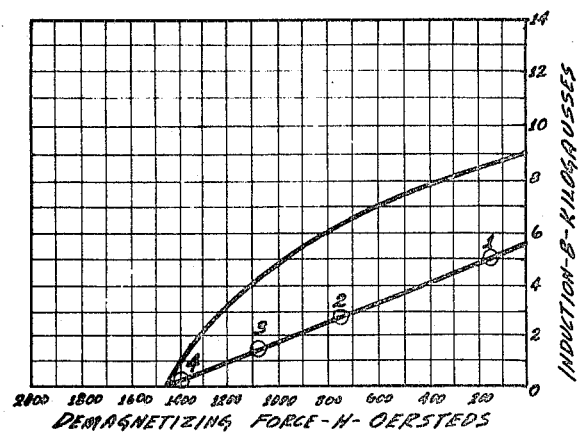
FIG. 3 depicts a typical demagnetization curve for an Alnico VIII permanent magnet.

When the coil 62 is energized, magnetic potential is developed across the armature 46. This potential opposes the permanent magnet 60 potential, thereby decreasing the force due to the permanent magnet 60. This effect can be illustrated with reference to FIG. 3 which depicts the energy product curves and major (A) and minor (B) hysteresis loop curves of an Alnico VIII permanent magnet. Importantly, demagnetization occurs on the minor hysteresis loop (B) as illustrated by conditions 1−4 thereof.

Referring back to FIG. 2, with the coil 62 energized as described, the permanent magnet potential is decreased to 37.5 force units. The coil 62 potential also generates magnetic flux about the upper frame flanges 50, serving as magnetic poles at all positions throughout the air gap thereat of say, 9.4 force units. The result is that the net magnetic moment is only 28.1 units which is opposed by the spring-bending moments of the isolation walls 20 and 22, totaling 75 units. This results in a total net moment of −46.9 units to move the armature-poppet assembly 46-34-36 from the closed position toward the open position. At the spring null positions of the isolation walls 20 and 22, the magnetic potential of the permanent magnet 60 is only 9.4 units which is opposed by a magnetic potential of about 37.5 units from the coil 62 for a total net moment of −28.1 units to accelerate the armature-poppet assembly 46-34-36 past the null points. At the open valve position, with the coil 42 energized, a coil 62 magnetic potential of 160 units opposes the permanent magnet 60 potential of 4.7 units and total spring moments of 75 units for a total net force of −80.3 units to bias the valve in the open position. When the current to the coil 62 is removed, the magnetic moment due to the coil 62 ceases whereupon the total spring moment of 75 units and the permanent magnet 60 moment, at that point, of 9.4 units accelerate the armature-poppet assembly 46-34-36 back to the closed position with a total force of 84.4 units. In passing the null points, the only moment generated, that of the permanent magnet 60, moves the assembly past the null point with a force of 37.5 units to seat the poppet 36. An inspection of the moment-deflection diagram of FIG. 2 reveals that there are static moments available at all armature positions to accelerate the armature-poppet assembly to an open position with coil current and to a closed position upon the removal of coil current.

In the foregoing device, magnetically permeable material is used only in the vicinity of the magnetic circuit so that the fluid chamber area is unaffected by generated magnetic fields.

We claim:

1. An on-off electromechanical valve for controlling fluid flow comprising;

chamber means defining an inlet port and an outlet port;

valve means including a seat and a valve disposed in said chamber for controlling flow therethrough between said ports;

first and second spring-diaphragm means sealingly secured to said chamber on opposite sides of said valve means and affixed to said valve means;

said first and second spring-diaphragm means having effective areas substantially equivalent to the area of said inlet and outlet ports respectively;

armature means connected to said valve means;

permanent magnet means magnetically coupled to said armature means and applying a force thereto to continuously urge said valve means in a first direction to a first stable position and to resiliently deform said first and second spring-diaphragm means in a first direction applying a force urging said valve means in a second direction opposite to said first direction; and an electromagnet means magnetically coupled to said armature means and, when energized, reducing the force applied by said permanent magnet means to a level such that the force applied by said spring-diaphragm means moves said valve means from said first stable position in said second direction.

2. A valve as defined in claim 1 wherein said electromagnet means, when energized, applies a force in said second direction sufficient to move said valve means to a second stable position and to resiliently deform said spring-diaphragm members in a second direction applying a force urging said valve means in said first direction.

3. A valve as defined in claim 2 wherein said permanent magnet means, said electromagnet means and said armature means are disposed externally of said chamber means.

4. A valve as defined in claim 3 which further includes a force transmission rod rigidly interconnecting said spring-diaphragm means thereby to impart substantially identical resilient deformation to said spring-diaphragm means.